US012809806B2

(12) United States Patent
Peng et al.

(10) Patent No.: US 12,809,806 B2
(45) Date of Patent: Nov. 24, 2026

(54) CHIPSET APPARATUS AND COMMUNICATION METHOD THEREOF HAVING DYNAMIC BANDWIDTH DISTRIBUTION MECHANISM

(71) Applicant: REALTEK SEMICONDUCTOR CORPORATION, Hsinchu (TW)

(72) Inventors: Siao-Yun Peng, Hsinchu (TW); Po-Jen Wang, Hsinchu (TW); Cheng-Yuan Hsiao, Hsinchu (TW); Sung-Kao Liu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 66 days.

(21) Appl. No.: 19/220,200

(22) Filed: May 28, 2025

(65) Prior Publication Data

US 2025/0370946 A1 Dec. 4, 2025

(30) Foreign Application Priority Data

May 30, 2024 (TW) ................................ 113120110

(51) Int. Cl.
*G06F 13/38* (2006.01)

(52) U.S. Cl.
CPC .... *G06F 13/385* (2013.01); *G06F 2213/0026* (2013.01)

(58) Field of Classification Search
CPC .......... H04L 12/24; H04L 12/26; H04L 12/56
See application file for complete search history.

(56) References Cited

U.S. PATENT DOCUMENTS 7,843,936 B2 * 11/2010 Lee .................... H04L 12/2885 370/395.2
2004/0264493 A1 * 12/2004 Han ....................... H04L 47/29 370/445

(Continued)

OTHER PUBLICATIONS

OA letter of a counterpart TW application (appl. No. 113120110) mailed on Jul. 22, 2025.

(Continued)

*Primary Examiner* — Getente A Yimer
(74) *Attorney, Agent, or Firm* — WPAT, PC

(57) ABSTRACT

The present invention discloses a chipset apparatus communication method that includes steps outlined below. A processor connection terminal having a total bandwidth is coupled to a processor. External apparatus connection terminals are coupled to external apparatuses. Individual packet transmission amounts and a total packet transmission amount of the external apparatus connection terminals between a first time point and a second time point are calculated, in which the external apparatus connection terminals have original bandwidth proportions. Amount ratios each between one of the individual packet transmission amounts and the total packet transmission amount are calculated. Weighting calculation is performed on the original bandwidth proportions and the amount ratios to generate un-normalized updated bandwidth proportions to be normalized to generate updated bandwidth proportions corresponding to the second time point. The total bandwidth is distributed according to the updated bandwidth proportions such that the external apparatus performs data transmission accordingly.

10 Claims, 2 Drawing Sheets

(56) References Cited

U.S. PATENT DOCUMENTS

| | | | | |
|---|---|---|---|---|
| 2006/0045023 | A1* | 3/2006 | Kim | H04L 1/24 370/468 |
| 2009/0196176 | A1* | 8/2009 | Nishimura | H04L 47/24 370/230.1 |
| 2009/0276542 | A1* | 11/2009 | Aweya | H04J 3/0667 709/248 |
| 2013/0003594 | A1* | 1/2013 | Amano | H04L 43/10 370/252 |
| 2013/0135996 | A1 | 5/2013 | Torres | |

OTHER PUBLICATIONS

Lie, Wen-Nung, "Chapter 6 Multilayer Neural Network", 2010, Lie, Wen-Nung, Taiwan.

* cited by examiner

CHIPSET APPARATUS AND COMMUNICATION METHOD THEREOF HAVING DYNAMIC BANDWIDTH DISTRIBUTION MECHANISM

BACKGROUND OF THE INVENTION

1. Field of the Invention

The present invention relates to a chipset apparatus and a chipset apparatus communication method thereof having dynamic bandwidth distribution mechanism.

2. Description of Related Art

A chipset is a full chip that integrates a plurality of microchips and is configured to couple a processor to other components, e.g., peripheral apparatuses, in a computer system to allow a data transmission to be performed therebetween.

The data transmission bandwidth between the processor and the chipset is limited. However, when a plurality of peripheral apparatuses perform the data transmission with the processor through the chipset simultaneously, a part of the peripheral apparatuses are not able to deal with the instant data transmission condition and thus may not obtain the default data transmission bandwidth supposed to be distributed thereto. If an efficient bandwidth distribution mechanism is absent, the data transmission efficiency decreases.

SUMMARY OF THE INVENTION

In consideration of the problem of the prior art, an object of the present invention is to supply a chipset apparatus and a chipset apparatus communication method thereof having dynamic bandwidth distribution mechanism.

The present invention discloses a chipset apparatus having dynamic bandwidth distribution mechanism disposed in a computer system that includes a processor connection terminal, a plurality of external apparatus connection terminals and a processing circuit. The processor connection terminal is electrically coupled to a processor of the computer system, in which the processor connection terminal has a total bandwidth. The external apparatus connection terminals are electrically coupled to a plurality of external apparatuses. The processing circuit is configured to periodically calculate a plurality of individual packet transmission amounts and a total packet transmission amount of the external apparatus connection terminals between a first time point and a second time point, wherein the external apparatus connection terminals have a plurality of original bandwidth proportions at the first time point, calculate a plurality of amount ratios each between one of the individual packet transmission amounts and the total packet transmission amount, based on a predetermined weighting ratio, perform a weighting calculation on each of the original bandwidth proportions according to a corresponding one of the amount ratios to generate a plurality of un-normalized updated bandwidth proportions, perform a normalizing calculation on the un-normalized updated bandwidth proportions according to a sum of the un-normalized updated bandwidth proportions to generate a plurality of updated bandwidth proportions of the external apparatus connection terminals corresponding to the second time point and distribute the total bandwidth according to the updated bandwidth proportions to generate a plurality of distributed bandwidths of the external apparatus connection terminals such that the external apparatuses perform a data transmission with the processor through the external apparatus connection terminals and the processor connection terminal according to the distributed bandwidth after the second time point.

The present invention also discloses a chipset apparatus communication method having dynamic bandwidth distribution mechanism used in a chipset apparatus disposed in a computer system that includes steps outlined below. A processor connection terminal is electrically coupled to a processor of the computer system, in which the processor connection terminal has a total bandwidth. A plurality of external apparatus connection terminals are electrically coupled to a plurality of external apparatuses. A plurality of individual packet transmission amounts and a total packet transmission amount of the external apparatus connection terminals between a first time point and a second time point are periodically calculated, wherein the external apparatus connection terminals have a plurality of original bandwidth proportions at the first time point. A plurality of amount ratios each between one of the individual packet transmission amounts and the total packet transmission amount are calculated. Based on a predetermined weighting ratio, a weighting calculation is performed on each of the original bandwidth proportions according to a corresponding one of the amount ratios to generate a plurality of un-normalized updated bandwidth proportions. A normalizing calculation is performed on the un-normalized updated bandwidth proportions according to a sum of the un-normalized updated bandwidth proportions to generate a plurality of updated bandwidth proportions of the external apparatus connection terminals corresponding to the second time point. The total bandwidth is distributed according to the updated bandwidth proportions to generate a plurality of distributed bandwidths of the external apparatus connection terminals such that the external apparatuses perform a data transmission with the processor through the external apparatus connection terminals and the processor connection terminal according to the distributed bandwidth after the second time point.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a chipset apparatus and a chipset apparatus communication method thereof having dynamic bandwidth distribution mechanism to periodically calculate amount ratios each between one of individual packet transmission amounts of different external apparatus connection terminals and a total packet transmission amount, to update original bandwidth proportions of the external apparatus connection terminals to generate updated bandwidth proportions such that external apparatuses perform a data transmission with a processor through the external apparatus connection terminals and a processor connection terminal of the chipset apparatus according to the updated bandwidth proportions. The object of dynamically distributing the bandwidth to the different external apparatuses that the different external apparatus connection terminals are electrically coupled to is thus obtained.

Figure 1:
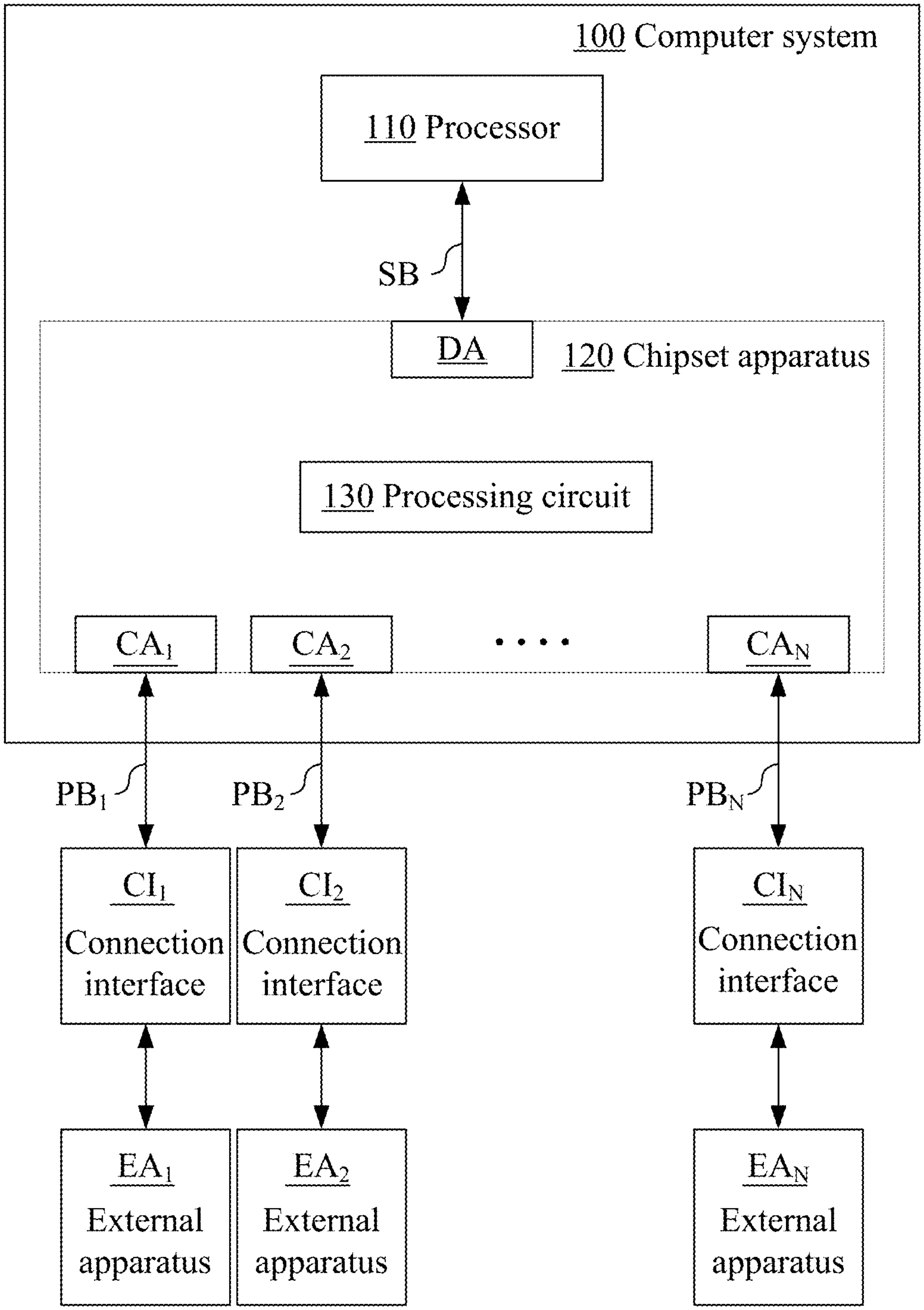
FIG. 1 illustrates a block diagram of a computer system and a plurality of external apparatuses electrically coupled to the computer system according to an embodiment of the present invention.

Reference is now made to FIG. 1. FIG. 1 illustrates a block diagram of a computer system 100 and a plurality of external apparatuses $EA_1$~$EA_N$ electrically coupled to the computer system 100 according to an embodiment of the present invention. The computer system 100 includes a processor 110 and a chipset apparatus 120.

The processor 110 is configured to operate an operation system or application programs. The external apparatuses $EA_1$~$EA_N$ can be various kinds of peripheral apparatuses coupled to the computer system 100 and are able to perform a data transmission with the computer system 100 to execute different functions requested by the processor 110.

The chipset apparatus 120 is configured to couple the processor 110 and the external apparatuses $EA_1$~$EA_N$, such that the data transmission between the processor 110 and the external apparatuses $EA_1$~$EA_N$ described above can be performed. In an embodiment, the chipset apparatus 120 can be such as, but not limited to a southbridge chipset.

The chipset apparatus 120 includes a processor connection terminal DA, a plurality of external apparatus connection terminals $CA_1$~$CA_N$ and a processing circuit 130.

The processor connection terminal DA is electrically coupled to the processor 110 of the computer system 100, in which the processor connection terminal DA has a total bandwidth. In an embodiment, the processor connection terminal DA is electrically coupled to the processor 110 through a system bus SB. The total bandwidth of the processor connection terminal DA is actually the total bandwidth available for the system bus SB to perform the data transmission.

The external apparatus connection terminals $CA_1$~$CA_N$ are electrically coupled to the external apparatuses $EA_1$~$EA_N$. In an embodiment, the external apparatus connection terminals $CA_1$~$CA_N$ are configured based on Peripheral Component Interconnect Express (PCI Express) protocol and are coupled to the external apparatuses $EA_1$~$EA_N$ selectively through such as, but not limited to buses $PB_1$~$PB_N$ of PCIe protocol, the connection interfaces $CI_1$~$CI_N$ of PCIe protocol or a combination thereof. In FIG. 1, the buses $PB_1$~$PB_N$ and the connection interfaces $CI_1$~$CI_N$ are illustrated to be disposed outside of the computer system 100. However, in practical implementation, the buses $PB_1$~$PB_N$ and the connection interfaces $CI_1$~$CI_N$ can be disposed to be a part of the computer system 100.

In an embodiment, each of the external apparatuses $EA_1$~$EA_N$ can be a single apparatus to be electrically coupled to one of the external apparatus connection terminals $CA_1$~$CA_N$ in a one-to-one manner. In an embodiment, each of the external apparatuses $EA_1$~$EA_N$ may also include a plurality of sub-apparatuses to be electrically coupled to one of the external apparatus connection terminals $CA_1$~$CA_N$ through the connection interfaces $CI_1$~$CI_N$ that allow a many-to-one manner of connection.

In an embodiment, the processing circuit 130 may access and operate related software/firmware (not illustrated in the figure) from a memory (not illustrated in the figure) further included by the chipset apparatus 120 to control the operation of the processor connection terminal DA and the external apparatus connection terminals $CA_1$~$CA_N$ such that the processor 110 and the external apparatuses $EA_1$~$EA_N$ can perform the data transmission described above. In an embodiment, the chipset apparatus 120 may include other hardware components to be controlled by the processing circuit 130 to accomplish other functions of the chipset apparatus 120. The present invention is not limited thereto.

However, the bandwidth of the processor connection terminal DA that the chipset apparatus 120 uses to perform the data transmission with the processor 110 is limited. As a result, the chipset apparatus 120 has a dynamic bandwidth distribution mechanism based on the operation of the processing circuit 130 to distribute the bandwidth of the data transmission performed with the external apparatuses $EA_1$~$EA_N$ that the external apparatus connection terminals $CA_1$~$CA_N$ are electrically coupled to according to an instant data transmission condition. The data transmission between the processor 110 and the external apparatuses $EA_1$~$EA_N$ becomes more efficient. The dynamic bandwidth distribution mechanism of the chipset apparatus 120 is described in detail in the following paragraphs.

At first, the processing circuit 130 periodically calculates a plurality of individual packet transmission amounts $$C_i^t$$

and a total packet transmission amount $$\sum_{i=1}^{N} C_i^t$$

of the external apparatus connection terminals $CA_1$~$CA_N$ between a first time point and a second time point.

Each of the individual packet transmission amounts is a number of packets transmitted by one of the external apparatus connection terminals $CA_1$~$CA_N$ to a corresponding one of the external apparatuses $EA_1$~$EA_N$ between the first time point and the second time point, wherein i is a value of 1~N to respectively correspond to the external apparatus connection terminals $CA_1$~$CA_N$, and t is the amount of time passes from the first time point to the second time point.

For example, when i is 3, such an individual packet transmission amount is the number of packets transmitted by the external apparatus connection terminal $CA_3$ to the external apparatuses $EA_3$ between the first time point and the second time point. The conditions corresponding to other values of i can be understood based on the same rationale and are not described herein.

The external apparatus connection terminals $CA_1$~$CA_N$ have a plurality of original bandwidth proportions $WO_i$ at the first time point. In an embodiment, when the first time point corresponds to a system initial state, the processing circuit 130 is configured to set the original bandwidth proportions $WO_i$ to equal to each other such that the total bandwidth is evenly distributed to the external apparatus connection terminals $CA_1$~$CA_N$. More specifically, when the total bandwidth is 100%, the processing circuit 130 sets the each of the original bandwidth proportions $WO_i$ corresponding to one of the external apparatus connection terminals $CA_1$~$CA_N$ to be (100/N) % in the system initial state.

The processing circuit 130 calculates a plurality of amount ratios $$R_i^t$$

each between one of the individual packet transmission amounts $$C_i^t$$

and total packet transmission amount $$\sum_{i=1}^{N} C_i^t.$$

The amount ratios $$R_i^t$$

are expressed by the following equation:

$$R_i^t = C_i^t / \sum_{i=1}^{N} C_i^t \quad \text{(equation 1)}$$

The amount ratios $$R_i^t$$

represents a ratio between the number of the packets transmitted by the i-th external apparatus $EA_i$ through the i-th external apparatus connection terminals $CA_i$ and the total number of the packets transmitted by all the external apparatuses $EA_1$~$EA_N$ through the external apparatus connection terminals $CA_1$~$CA_N$ in the time length t between the first time point and the second time point, in which each of the amount ratio $$R_i^t$$

is used to evaluate the usage performance of the total bandwidth of the external apparatuses $EA_i$.

Subsequently, based on a predetermined weighting ratio, the processing circuit 130 performs a weighting calculation on each of the original bandwidth proportions $WO_i$ according to a corresponding one of the amount ratios $$R_i^t$$

to generate a plurality of un-normalized updated bandwidth proportions $WU_i$.

The predetermined weighting ratio includes a first weighting parameter 1-α and a second weighting parameter α. Each of the un-normalized updated bandwidth proportions $WU_i$ is generated by adding a first value and a second value, in which the first value is generated by multiplying one of the original bandwidth proportions $WO_i$ and the first weighting parameter 1-α, and the second value is generated by multiplying a corresponding one of the amount ratios $$R_i^t$$

and the second weighting parameter α. More specifically, the un-normalized updated bandwidth proportions $WU_i$ are expressed by the following equation:

$$WU_i = (1-\alpha) \times WO_i + \alpha \times R_i^t \quad \text{(equation 2)}$$

Since the sum of the un-normalized updated bandwidth proportions $WU_i$ calculated by (equation 2) may not equal to 1, the processing circuit 130 performs a normalizing calculation on the un-normalized updated bandwidth proportions $WU_i$ according to a sum $$\sum_{i=1}^{n} WU_i$$

of all the un-normalized updated bandwidth proportions $WU_i$ to generate a plurality of updated bandwidth proportions $WD_i$ of the external apparatus connection terminals $CA_1$~$CA_N$ corresponding to the second time point. More specifically, the updated bandwidth proportions $WD_i$ are expressed by the following equation:

$$WD_i = WU_i / \left(\sum_{i=1}^{n} WU_i\right) = ((1-\alpha) \times WO_i + \alpha \times R_i^t) / \left(\sum_{i=1}^{n} (1-\alpha) \times WO_i + \alpha \times R_i^t\right) \quad \text{(equation 3)}$$

In an embodiment, a calculated un-normalized updated bandwidth proportion $WU_i$ may be close to 0 such that the calculated updated bandwidth proportion $WD_i$ equals to 0. As a result, the processing circuit 130 sets any one of the un-normalized updated bandwidth proportions $WU_i$ that is smaller than a predetermined value WT to be the predetermined value WT and calculates the updated bandwidth proportions $WD_i$ accordingly.

The processing circuit 130 distributes the total bandwidth according to the updated bandwidth proportions $WD_i$ to generate a plurality of distributed bandwidths of the external apparatus connection terminals $CA_1$~$CA_N$ such that the external apparatuses $EA_1$~$EA_N$ perform a data transmission through the external apparatus connection terminals $CA_1$~$CA_N$ and the processor connection terminal DA according to the distributed bandwidth after the second time point.

It is appreciated that the processing circuit 130 may periodically perform the operations described above. The processing circuit 130 may treat the second time point described above as the first time spot of the next period and treat a time point behind the new first time spot as the second time point of the next period, so as to keep updating the bandwidth proportions and distribute the bandwidth accordingly.

A plurality of usage scenarios having numerical examples are used to further describe the dynamic bandwidth distribution mechanism of the chipset apparatus 120. In the usage scenarios below, Nis 5. In other words, the number of the external apparatus connection terminals $CA_1$~$CA_N$ is 5.

In the first usage scenario, the first weighting parameter 1-α is 0.3 and the second weighting parameter α is 0.7. The predetermined value WT is 5%. Each of the original bandwidth proportions $WO_1$, $WO_2$, $WO_3$, $WO_4$ and $WO_5$ of the five external apparatus connection terminals $CA_1$~$CA_5$ is 20%, and each of the individual packet transmission amounts $$C_1^t, C_2^t, C_3^t, C_4^t \text{ and } C_5^t$$

of the five external apparatus connection terminals $CA_1$~$CA_5$ is 0. The total packet transmission amount $$\sum_{i=1}^{N} C_i^t$$

is 0.

Under such a condition, the amount ratios $$R_1^t, R_2^t, R_3^t, R_4^t \text{ and } R_5^t$$

can be calculated by using (equation 1):

$$R_1^t = R_2^t = R_3^t = R_4^t = R_5^t = 0/0 = 0\%$$

The un-normalized updated bandwidth proportions $WU_1$, $WU_2$, $WU_3$, $WU_4$ and $WU_5$ can be calculated by using (equation 2):

$$WU_1 = WU_2 = WU_3 = WU_4 = WU_5 = 0.3 \times 20\% + 0.7 \times 0\% = 0.06.$$

The updated bandwidth proportions $WD_1$, $WD_2$, $WD_3$, $WD_4$ and $WD_5$ can be calculated by using (equation 3):

$$WD_1 = WD_2 = WD_3 = WD_4 = WD_5 = 0.06/(0.06 \times 5) = 20\%.$$

As a result, in the first usage scenario, the processing circuit 130 sets the distributed bandwidths each being 20% of the total bandwidth to the five external apparatus connection terminals $CA_1$~$CA_5$ according to the updated bandwidth proportions $WD_1$, $WD_2$, $WD_3$, $WD_4$ and $WD_5$.

In the second usage scenario, the first weighting parameter 1-α is 0.3, and the second weighting parameter α is 0.7. The predetermined value WT is 5%. Each of the original bandwidth proportions $WO_1$, $WO_2$, $WO_3$, $WO_4$ and $WO_5$ of the five external apparatus connection terminals $CA_1$~$CA_5$ is 20%. The individual packet transmission amount $$C_1^t$$

of the external apparatus connection terminal $CA_1$ is 53. Each of the individual packet transmission amounts $$C_2^t, C_3^t, C_4^t \text{ and } C_5^t$$

of the external apparatus connection terminals $CA_2$~$CA_5$ is 0. The total packet transmission amount $$\sum_{i=1}^{N} C_i^t$$

is thus 53.

Under such a condition, the amount ratio $$R_1^t$$

can be calculated by using (equation 1):

$$R_1^t = 53/53 = 100\%$$

The amount ratios $$R_2^t, R_3^t, R_4^t \text{ and } R_5^t$$

can be calculated by using (equation 1):

$$R_2^t = R_3^t = R_4^t = R_5^t = 0/53 = 0\%$$

The un-normalized updated bandwidth proportion $WU_1$ can be calculated by using (equation 2): $WU_1$=0.3×20%+0.7×100%=0.76. The un-normalized updated bandwidth proportions $WU_2$, $WU_3$, $WU_4$ and $WU_5$ can be calculated by using (equation 2): $WU_2$=$WU_3$=$WU_4$=$WU_5$=0.3×20%+0.7×0%=0.06. The sum of un-normalized updated bandwidth proportions $WU_1$, $WU_2$, $WU_3$, $WU_4$ and $WU_5$ is 0.76+0.06×4=1.

The updated bandwidth proportion $WD_1$ can be calculated by using (equation 3): $WD_1$=0.76/1=76%. The updated bandwidth proportions $WD_2$, $WD_3$, $WD_4$ and $WD_5$ can be calculated by using (equation 3): $WD_1$=$WD_2$=$WD_3$=$WD_4$=$WD_5$=0.06/1=6%.

As a result, in the second usage scenario, the processing circuit 130 sets the distributed bandwidths to the five external apparatus connection terminals $CA_1$~$CA_5$ to be 76%, 6%, 6%, 6% and 6% of the total bandwidth according to the updated bandwidth proportions $WD_1$, $WD_2$, $WD_3$, $WD_4$ and $WD_5$.

In the third usage scenario, the first weighting parameter 1-α is 0 and the second weighting parameter α is 1. The predetermined value WT is 5%. Each of the original bandwidth proportions $WO_1$, $WO_2$, $WO_3$, $WO_4$ and $WO_5$ of the five external apparatus connection terminals $CA_1$~$CA_5$ is 20%. The individual packet transmission amount $$C_2^t$$

of the external apparatus connection terminal $CA_2$ is 31, the individual packet transmission amount $$C_3^t$$

of the external apparatus connection terminal $CA_3$ is 72 and each of the individual packet transmission amounts $$C_1^t, C_4^t \text{ and } C_5^t$$

is 0. The total packet transmission amount $$\sum_{i=1}^{N} C_i^t$$

is thus 103.

Under such a condition, the amount ratios $$R_2^t \text{ and } R_3^t$$

can be calculated by using (equation 1), in which $$R_2^t = 31/103 = 0.301 \text{ and } R_3^t = 72/103 = 0.699.$$

The amount ratios $$R_1^t, R_4^t \text{ and } R_5^t$$

can be calculated by using (equation 1), in which $$R_1^t = R_4^t = R_5^t = 0/103 = 0\%.$$

The un-normalized updated bandwidth proportions $WU_2$ and $WU_3$ can be calculated by using (equation 2), in which $WU_2=0\times20\%+1\times 30.1\%=0.301$ and $WU_3=0\times20\%+1\times 69.9\%=0.699$. The un-normalized updated bandwidth proportions $WU_1$, $WU_4$ and $WU_5$ can be calculated by using (equation 2), in which $WU_1=WU_4=WU_5=0\times20\%+1\times 0\%=0.02$. The un-normalized updated bandwidth proportions $WU_1$, $WU_4$ and $WU_5$ are smaller than the predetermined value WT, which is 5%, and are set to be 0.05. The sum of all the un-normalized updated bandwidth proportions $WU_1$, $WU_2$, $WU_3$, $WU_4$ and $WU_5$ is $0.301+0.699+0.05\times 3=1.15$.

The updated bandwidth proportions $WD_2$ and $WD_3$ can be calculated by using (equation 3), in which $WD_2=0.301/1.15=26.174\%$ and $WD_3=0.699/1.15=60.783\%$. The updated bandwidth proportions $WD_1$, $WD_4$ and $WD_5$ can be calculated by using (equation 3), in which $WD_1=WD_4=WD_5=0.05/1.15=4.348\%$.

As a result, in the third usage scenario, the processing circuit 130 distributed bandwidths to the five external apparatus connection terminals $CA_1$~$CA_5$ to be 4.348%, 26.174%, 60.783%, 4.348% and 4.348% of the total bandwidth according to the updated bandwidth proportions $WD_1$, $WD_2$, $WD_3$, $WD_4$ and $WD_5$.

In the fourth usage scenario, the first weighting parameter 1-α is 0.3 and the second weighting parameter α is 0.7. The predetermined value WT is 5%. Each of the original bandwidth proportions $WO_1$, $WO_2$, $WO_3$, $WO_4$ and $WO_5$ of the five external apparatus connection terminals $CA_1$~$CA_5$ is 20%. The individual packet transmission amount $$C_1^t$$

of the external apparatus connection terminal $CA_1$ is 33. The individual packet transmission amount $$C_3^t$$

of the external apparatus connection terminal $CA_3$ is 59. The individual packet transmission amount $$C_4^t$$

of the external apparatus connection terminal $CA_4$ is 124. Each of the individual packet transmission amounts $$C_2^t \text{ and } C_5^t$$

of the external apparatus connection terminals $CA_2$ and $CA_5$ is 0. The total packet transmission amount $$\sum_{i=1}^{N} C_i^t$$

is 216.

Under such a condition, the amount ratios $$R_1^t, R_3^t \text{ and } R_4^t$$

can be calculated by using (equation 1), in which $$R_1^t = 33/216 = 0.15278,$$

$$R_3^t = 59/216 = 0.27315 \text{ and } R_4^t = 124/216 = 0.57407.$$

The amount ratios $$R_2^t \text{ and } R_5^t$$

can be calculated by using (equation 1):

$$R_2^t = R_5^t = 0/216 = 0\%.$$

The un-normalized updated bandwidth proportions $WU_1$, $WU_3$ and $WU_4$ can be calculated by using (equation 2), in which $WU_1$=0.3×20%+0.7×15.278% %=0.16695, $WU_3$=0.3×20%+0.7×27.315%=0.25121 and $WU_4$=0.3×20%+0.7×57.407%=0.46185. The un-normalized updated bandwidth proportions $WU_2$ and $WU_5$ can be calculated by using (equation 2), in which $WU_2$=$WU_5$=0.3×20%+0.7×0%=0.06. The sum of all the un-normalized updated bandwidth proportions $WU_1$, $WU_2$, $WU_3$, $WU_4$ and $WU_5$ is 0.16695+0.25121+0.46185+0.06×2=1.00001.

The updated bandwidth proportions $WD_1$, $WD_3$ and $WD_4$ can be calculated by using (equation 3), in which $WD_1$=0.16695/1.00001=16.695%, $WD_3$=0.25121/1.00001=25.121% and $WD_4$=0.46185/1.00001=46.185%.

The updated bandwidth proportions $WD_2$ and $WD_5$ can be calculated by using (equation 3), in which $WD_2$=$WD_5$=0.06/1.00001=6%.

As a result, in the fourth usage scenario, the processing circuit 130 distributed bandwidths to the five external apparatus connection terminals $CA_1$~$CA_5$ to be 16.695%, 6%, 25.121%, 46.185% and 6% of the total bandwidth according to the updated bandwidth proportions $WD_1$, $WD_2$, $WD_3$, $WD_4$ and $WD_5$.

According to the embodiments described above, the chipset apparatus of the present invention periodically calculates amount ratios each between one of individual packet transmission amounts of different external apparatus connection terminals and a total packet transmission amount, to update original bandwidth proportions of the external apparatus connection terminals to generate updated bandwidth proportions such that external apparatuses perform a data transmission with a processor through the external apparatus connection terminals and a processor connection terminal of the chipset apparatus according to the updated bandwidth proportions. The object of dynamically distributing the bandwidth to the different external apparatuses that the different external apparatus connection terminals are electrically coupled to is thus obtained.

Figure 2:
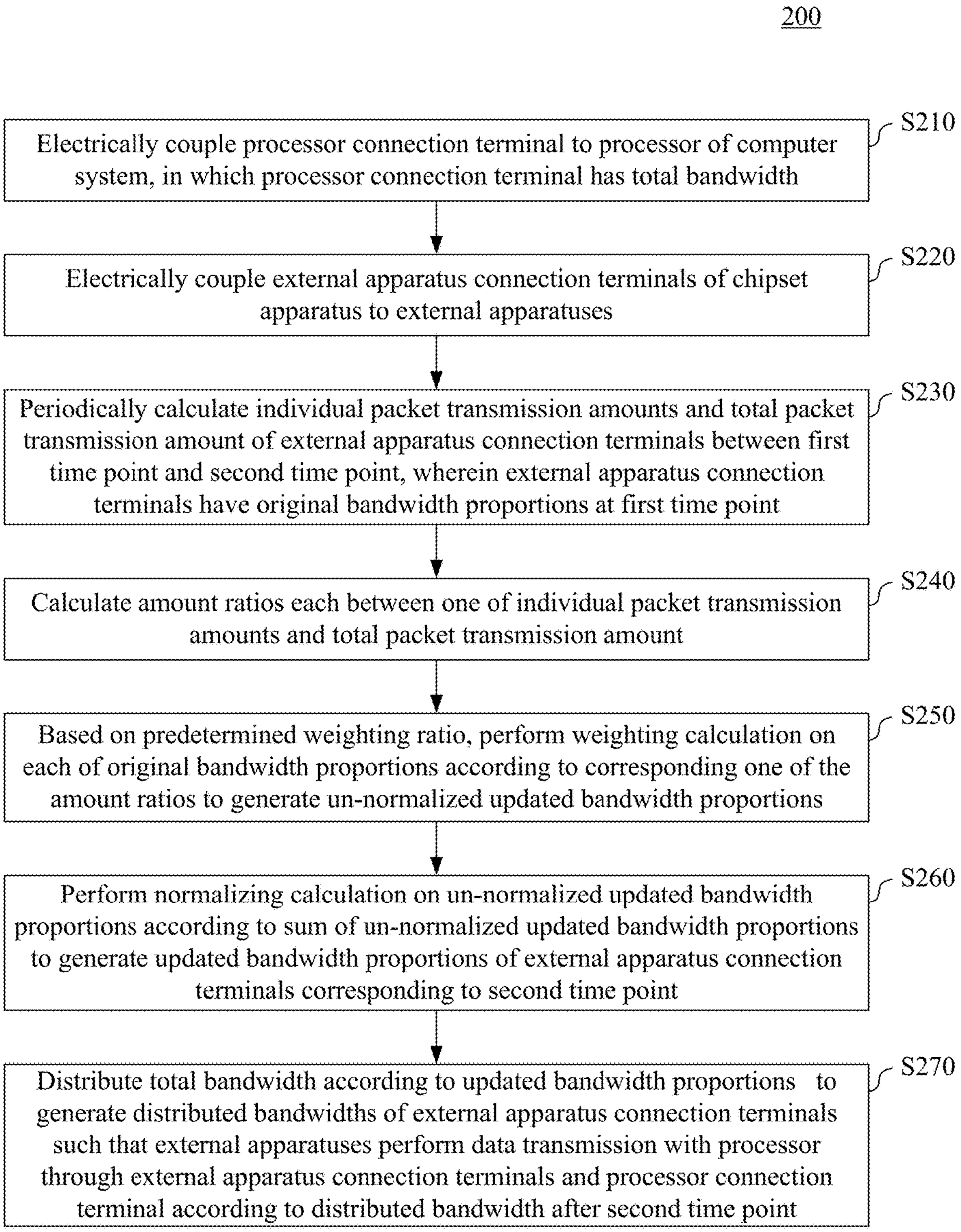
FIG. 2 illustrates a flow chart of a chipset apparatus communication method having a dynamic bandwidth distribution mechanism according to an embodiment of the present invention.

Reference is now made to FIG. 2. FIG. 2 illustrates a flow chart of a chipset apparatus communication method 200 having a dynamic bandwidth distribution mechanism according to an embodiment of the present invention.

In addition to the apparatus described above, the present invention further provides a chipset apparatus communication method 200 having the dynamic bandwidth distribution mechanism that can be used in such as, but not limited to, the chipset apparatus 120 in FIG. 1. As illustrated in FIG. 2, an embodiment of the chipset apparatus communication method 200 includes the following steps.

In step S210, the processor connection terminal DA is electrically coupled to the processor 110 of the computer system 100, in which the processor connection terminal DA has the total bandwidth.

In step S220, the external apparatus connection terminals $CA_1$~$CA_N$ of the chipset apparatus 120 are electrically coupled to the external apparatuses $EA_1$~$EA_N$.

In step S230, the individual packet transmission amounts $$C_i^t$$

and the total packet transmission amount $$\sum_{i=1}^{N} C_i^t$$

of the external apparatus connection terminals $CA_1$~$CA_N$ between the first time point and the second time point are periodically calculated, wherein the external apparatus connection terminals $CA_1$~$CA_N$ have the original bandwidth proportions $WO_i$ at the first time point.

In step S240, the amount ratios $$R_i^t$$

each between one of the indivisual packet transmission amounts $$C_i^t$$

and the total packet transmission amount $$\sum_{i=1}^{N} C_i^t$$

calculated.

In step S250, based on the predetermined weighting ratio, the weighting calculation is performed on each of the original bandwidth proportions $WO_i$ according to the corresponding one of the amount ratios $$R_i^t$$

to generate the un-normalized updated bandwidth proportions $WU_i$.

In step S260, the normalizing calculation is performed on the un-normalized updated bandwidth proportions $WU_i$ according to the sum $$\sum_{i=1}^{N} WU_i$$

un-normalized updated bandwidth proportions $WU_i$ to generate the updated bandwidth proportions $WD_i$ of the external apparatus connection terminals $CA_1$~$CA_N$ corresponding to the second time point.

In step S270, the total bandwidth is distributed according to the updated bandwidth proportions $WD_i$ to generate the distributed bandwidths of the external apparatus connection terminals $CA_1$~$CA_N$ such that the external apparatuses $EA_1$~$EA_N$ perform a data transmission with the processor 110 through the external apparatus connection terminals $CA_1$~$CA_N$ and the processor connection terminal DA according to the distributed bandwidth after the second time point.

It is appreciated that the embodiments described above are merely an example. In other embodiments, it should be appreciated that many modifications and changes may be made by those of ordinary skill in the art without departing, from the spirit of the disclosure.

In summary, the present invention discloses the chipset apparatus and the chipset apparatus communication method thereof having dynamic bandwidth distribution mechanism to periodically calculate amount ratios each between one of individual packet transmission amounts of different external apparatus connection terminals and a total packet transmission amount, to update original bandwidth proportions of the external apparatus connection terminals to generate updated bandwidth proportions such that external apparatuses perform a data transmission with a processor through the external apparatus connection terminals and a processor connection terminal of the chipset apparatus according to the updated bandwidth proportions. The object of dynamically distributing the bandwidth to the different external apparatuses that the different external apparatus connection terminals are electrically coupled to is thus obtained.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A chipset apparatus having dynamic bandwidth distribution mechanism disposed in a computer system, comprising:
- a processor connection terminal electrically coupled to a processor of the computer system, in which the processor connection terminal has a total bandwidth;
- a plurality of external apparatus connection terminals electrically coupled to a plurality of external apparatuses; and
- a processing circuit configured to:
  - periodically calculate a plurality of individual packet transmission amounts and a total packet transmission amount of the external apparatus connection terminals between a first time point and a second time point, wherein the external apparatus connection terminals have a plurality of original bandwidth proportions at the first time point;
  - calculate a plurality of amount ratios each between one of the individual packet transmission amounts and the total packet transmission amount;
  - based on a predetermined weighting ratio, perform a weighting calculation on each of the original bandwidth proportions according to a corresponding one of the amount ratios to generate a plurality of un-normalized updated bandwidth proportions;
  - perform a normalizing calculation on the un-normalized updated bandwidth proportions according to a sum of the un-normalized updated bandwidth proportions to generate a plurality of updated bandwidth proportions of the external apparatus connection terminals corresponding to the second time point; and
  - distribute the total bandwidth according to the updated bandwidth proportions to generate a plurality of distributed bandwidths of the external apparatus connection terminals such that the external apparatuses perform a data transmission with the processor through the external apparatus connection terminals and the processor connection terminal according to the distributed bandwidth after the second time point.

2. The chipset apparatus of claim 1, wherein when the first time point corresponds to a system initial state, the processing circuit is configured to set the original bandwidth proportions to equal to each other such that the total bandwidth is evenly distributed to the external apparatus connection terminals.

3. The chipset apparatus of claim 1, wherein the processing circuit sets any one of the un-normalized updated bandwidth proportions that is smaller than a predetermined value to be the predetermined value.

4. The chipset apparatus of claim 1, wherein the predetermined weighting ratio comprises a first weighting parameter and a second weighting parameter, each of the un-normalized updated bandwidth proportions is generated by adding a first value and a second value, in which the first value is generated by multiplying one of the original bandwidth proportions and the first weighting parameter, and the second value is generated by multiplying a corresponding one of the amount ratios and the second weighting parameter.

5. The chipset apparatus of claim 1, wherein the external apparatus connection terminals are configured based on Peripheral Component Interconnect Express (PCI Express) protocol.

6. A chipset apparatus communication method having dynamic bandwidth distribution mechanism used in a chipset apparatus disposed in a computer system, comprising:
- electrically coupling a processor connection terminal to a processor of the computer system, in which the processor connection terminal has a total bandwidth;
- electrically coupling a plurality of external apparatus connection terminals to a plurality of external apparatuses;
- periodically calculating a plurality of individual packet transmission amounts and a total packet transmission amount of the external apparatus connection terminals between a first time point and a second time point, wherein the external apparatus connection terminals have a plurality of original bandwidth proportions at the first time point;
- calculating a plurality of amount ratios each between one of the individual packet transmission amounts and the total packet transmission amount;
- based on a predetermined weighting ratio, performing a weighting calculation on each of the original bandwidth proportions according to a corresponding one of the amount ratios to generate a plurality of un-normalized updated bandwidth proportions;
- performing a normalizing calculation on the un-normalized updated bandwidth proportions according to a sum of the un-normalized updated bandwidth proportions to generate a plurality of updated bandwidth proportions of the external apparatus connection terminals corresponding to the second time point; and
- distributing the total bandwidth according to the updated bandwidth proportions to generate a plurality of distributed bandwidths of the external apparatus connection terminals such that the external apparatuses perform a data transmission with the processor through the external apparatus connection terminals and the processor connection terminal according to the distributed bandwidth after the second time point.

7. The chipset apparatus communication method of claim 6, further comprising:
- when the first time point corresponds to a system initial state, setting the original bandwidth proportions to equal to each other such that the total bandwidth is evenly distributed to the external apparatus connection terminals.

8. The chipset apparatus communication method of claim 6, further comprising:

setting any one of the un-normalized updated bandwidth proportions that is smaller than a predetermined value to be the predetermined value.

9. The chipset apparatus communication method of claim 6, wherein the predetermined weighting ratio comprises a first weighting parameter and a second weighting parameter, each of the un-normalized updated bandwidth proportions is generated by adding a first value and a second value, in which the first value is generated by multiplying one of the original bandwidth proportions and the first weighting parameter, and the second value is generated by multiplying a corresponding one of the amount ratios and the second weighting parameter.

10. The chipset apparatus communication method of claim 6, wherein the external apparatus connection terminals are configured based on Peripheral Component Interconnect Express protocol.

* * * * *